April 5, 1949.    F. C. FRANK ET AL    2,466,224
HYDRAULIC SYSTEM FOR ACTUATING BRAKES
Filed Aug. 30, 1944    2 Sheets-Sheet 2
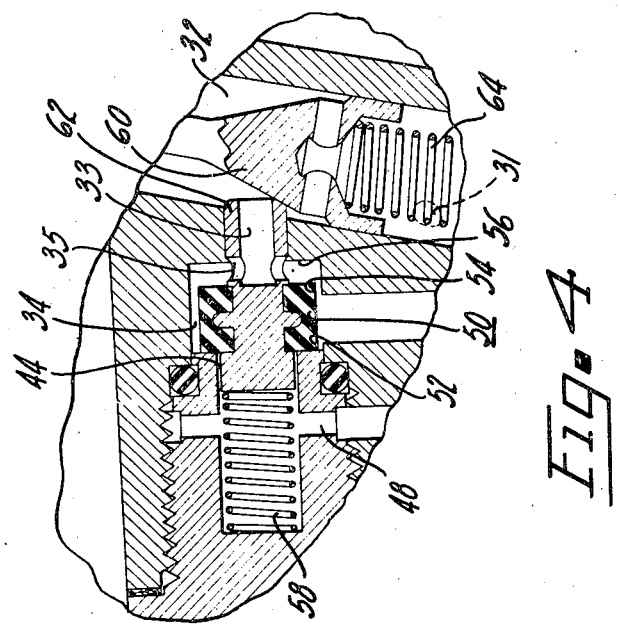
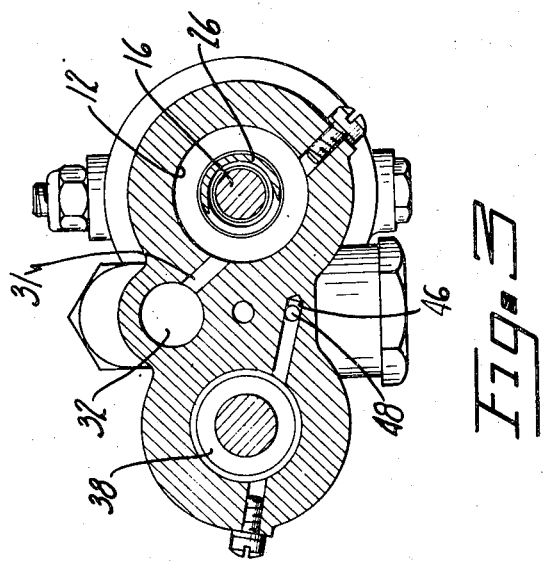
INVENTORS
FREDERICK C. FRANK
WILLIAM H. DU BOIS
BY
ATTORNEY Patented Apr. 5, 1949

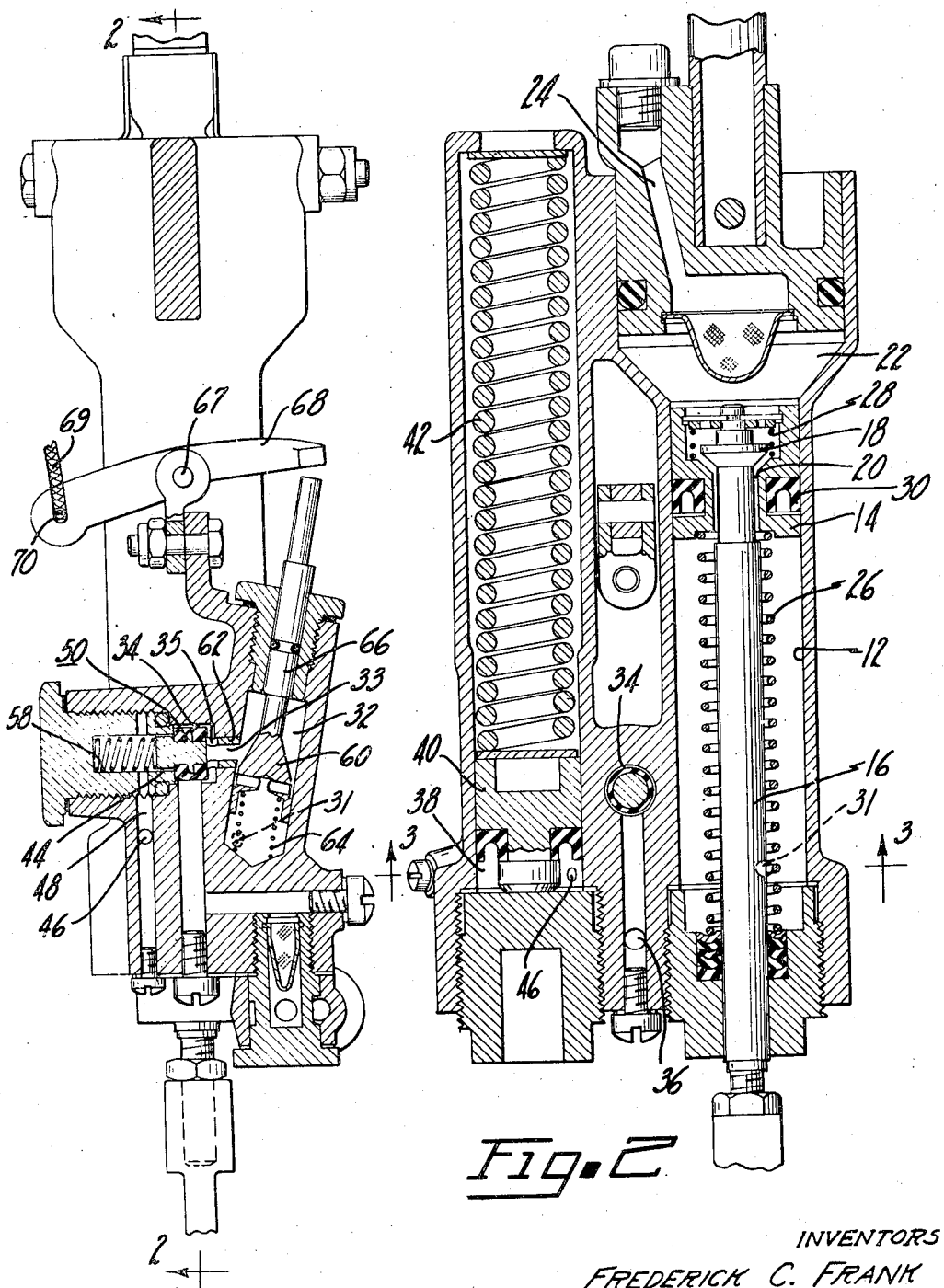

2,466,224

UNITED STATES PATENT OFFICE 2,466,224

HYDRAULIC SYSTEM FOR ACTUATING BRAKES

Frederick C. Frank and William H. Du Bois, South Bend, Ind., assignors to Bendix Aviation Corporation, South Bend, Ind., a corporation of Delaware Application August 30, 1944, Serial No. 551,838

3 Claims. (Cl. 60—54.5)

This invention relates to hydraulic systems for actuating brakes, and particularly to hydraulic systems which are used both to accomplish the ordinary service applications of the brakes and to set and hold the brakes for parking purposes.

An object of the invention is to provide an improved hydraulic system for actuating brakes wherein means are provided for maintaining the brakes applied during parking regardless of variations in volume of the fluid and wherein means are also provided for preventing the aforesaid means from having any effect on the hydraulic system during normal service brake applications.

A further object of the invention is to provide a hydraulic brake actuating system having the attributes mentioned in the preceding paragraph, and additionally having means for permitting an increased amount of fluid to be displaced from the master cylinder by pumping or multiple stroking when the brakes are to be set for parking.

An important object of the invention is to provide a parking brake which can be released by the simple expedient of building up pressure in the hydraulic system. This is particularly important in aircraft hydraulic braking systems, since the operation of the parking brakes is selected by means of a manually operated cable, which can act in one direction only. When the operator wishes to move the valves to positions in which the brakes will be conditioned for parking, he exerts a pulling force on the cable. Since force cannot be exerted through the cable to move the valves to non-parking position, other provisions must therefore be made for release of the brakes after parking.

A further object of the invention is to provide a braking system having the feature described in the preceding paragraph and also one or more of the other features heretofore listed.

A still further object of the invention is to provide, in addition to the means for normally preventing operation of the parking brake holding means, improved means for automatically locking the fluid in the system whenever the operator wishes to use the brakes for parking.

Yet another object is to provide a single valve member which can select either service or parking brakes. When the service brakes are selected, the lines between the master cylinder and the brake actuating motors are held open, and the part of the system which is furnished for holding the brakes during parking is cut off from the main system. On the other hand, when the parking brakes are selected, the parking part of the system is in communication with the fluid lines, and also the means for automatically locking the fluid in the system is made operative.

A further object of the invention is to accomplish the several purposes and objects alluded to by means of an uncomplicated, light, and inexpensive structure.

Other objects and advantages of the invention will become apparent from the following description, reference being had therein to the accompanying drawings, in which:

Figure 1 is a section taken through a control for a hydraulic braking system, of a type which incorporates our invention;

Figure 2 is a section taken on the line 2—2 of Figure 1;

Figure 3 is a section taken on the line 3—3 of Figure 2; and

Figure 4 is a closeup of a portion of the structure shown in Figure 1.

The device shown in the several figures is adapted to act as a control for hydraulically actuated brakes. This device is not only arranged to provide the customary service brake applying means, but also to provide a parking brake applying means by permitting the fluid to be held under pressure in the lines. This arrangement is particularly adapted for modern airplane braking systems.

A master cylinder bore 12, which may be located on a vertical axis as shown, has the usual piston 14 reciprocable therein. This piston is adapted to be drawn downwardly by means of a manually operable rod 16, the rod actuating the piston by means of an enlargement 18, which also acts as a valve member controlling the passage 20 through the piston. When the rod 16 and piston 14 are in released position, as shown, valve member 18 is unseated to permit communication of passage 20 with a reservoir chamber 22 above the piston. If desired, this reservoir chamber 22 may be connected by means of passage 24 with another reservoir having a greater volume. The master cylinder may be mounted on the body of the vehicle by any suitable means.

The piston may be urged to released position by means of a return spring 26, and an additional spring 28 may normally bias the valve member 18 to open position, as shown. The usual seal 30 is provided for the master cylinder piston.

The outlet of the master cylinder bore 12 may be seen most clearly in Figure 3, wherein it is shown connected by means of passage 31 with a chamber 32, and the chamber 32 in turn communicates through passage 33 and ports 35 with a chamber 34 (see Figures 1 and 4). The chamber 34 is in communication with the brake actuating motor or motors by means of a port 36 (seen in Figure 2), and by means of the usual fluid carrying conduit or conduits.

The normal or service brake applications are obtained by exerting a force through rod 16 against piston 14, drawing the piston downwardly in bore 12 and displacing fluid to the brake actuating motors to apply the brakes.

Since it is contemplated that the hydraulic system be also used as a means for holding the brakes applied when the vehicle is parked, means are provided for locking fluid in the system to hold the brakes applied when desired, and means are also provided for compensating for changes in the volume of the fluid during the time it remains trapped in the lines.

There are several reasons for providing means for compensating for changes in fluid volume during the time the fluid is trapped in the lines. In case there is a certain amount of fluid loss due to leakage, it is necessary to have expansible means for maintaining pressure in the system. Likewise, if the fluid in the lines is hot at the time the brakes are first set for parking, and subsequently becomes considerably cooler, contraction of fluid will release the brakes, unless means are provided in the system for maintaining a pressure. On the other hand, if the fluid is cool at the time the brakes are set for parking, and subsequently is heated considerably, the brakes would become locked unless a compressible medium were provided to allow the required expansion without building up an excessively high pressure. It is also possible that the building of an excessively high pressure in the lines due to an expansion of the fluid might injure some of the parts of the brake system.

Changes in volume of fluid in the brake lines are particularly important where the hydraulic system is used to actuate airplane brakes. For example, the fluid may become hot to the point of boiling during a particularly severe stop after the plane lands, and subsequently, particularly if the plane remains parked for a relatively long period, and the temperature cools considerably, the contraction of fluid in the lines will be quite noticeable. On the other hand, the fluid may become quite cold as the airplane is flying at a considerable altitude, and subsequently as the plane is landed and parked in a region having a high temperature, the volume of fluid may be considerably expanded.

In order to compensate for such changes in fluid volume while the parking brakes are set, an expansible chamber 38 is provided. Reciprocable in this chamber is a piston 40, which is loaded by a relatively heavy compression spring 42. If fluid is forced into chamber 38 to move the piston 40 upwardly against the resistance of spring 42, energy will be stored in the spring. Should the volume of fluid in the system subsequently decrease, the pressure of the spring will maintain sufficient pressure in the system to hold the brakes applied. On the other hand if the pressure against the spring should increase due to expansion of fluid in the system while the brakes remain applied, the spring 42 can be further compressed to compensate for such expansion.

Expansible chamber 38 is at times in communication with chamber 34 through passage 44 (see Figure 1). In the particular construction shown in the drawings, chamber 38 is connected to passage 44 by means of intersecting passages 46 and 48.

Although it is desired to have an expansible chamber, such as chamber 38, which will compensate for changes in fluid volume while the brakes remain set, there are certain disadvantages in allowing free communication of the expansible chamber with the brake lines under all circumstances, as has heretofore usually been the case. During ordinary brake application there is no purpose to be served by forcing part of the fluid into the expansible chamber, and it has the disadvantage that part of the fluid displaced must be used in compressing the spring 42, and therefore performs no useful work in applying the brakes. This means, in effect, a loss of pedal travel.

In order to conserve pedal travel during normal or service braking operations, we have provided means for normally cutting off expansible chamber 38 from the brake lines. This may be accomplished by blocking off passage 44. Although we do not intend to limit ourselves to such a construction, we find it particularly convenient to utilize a single valve member both for blocking off the expansible chamber during normal service brake applications, and for locking fluid in the lines when the brakes are set for parking. To this end, we have provided a valve member 50 having seating surfaces 52 and 54 at opposite sides thereof. The seating surface 52 is adapted to close passage 44 and thereby cut off expansible chamber 38 from the fluid lines, which it will be remembered, are connected to chamber 34. The opposite seating surface 54 of valve member 50 is adapted to seat at 56 to cut off communication between the master cylinder bore 12 and chamber 34. A compression spring 58 exerts a force tending to move valve member 50 away from the mouth of passage 44 and toward seat 56.

However, a cam member 60 normally contacts an extension 62 of valve member 50 to hold the valve member in the position shown in Figures 1 and 4, in which it seats at the mouth of passage 44, while allowing communication between chambers 32 and 34. The cam member 60 is held in this position by means of a compression spring 64, which is sufficiently effective to overcome spring 58. The relative effectiveness of springs 64 and 58 of course depends not only on the inherent force of the springs, but upon the mechanical leverage ratio of the mechanism between the springs.

The position of cam member 60 is under the control of the operator by means of rod 66, and lever 68 which is fulcrumed at 67. The control end of the lever 68 is provided with an eye 70, by means of which it is connected to a cable 69. The cable 69 is a particularly satisfactory and inexpensive control for the lever 68. Usually the distance through which the control must extend on an airplane is considerable, and it is not feasible, to use a rod or other connection through which force can be exerted in both directions. Since the cable is operable only under tension, other means must be provided for returning valve member 50 and cam member 60 after they have been moved downwardly by the lever and cable.

When valve member 50 is in the position shown in Figures 1 and 4, expansible chamber 38 is cut off from the fluid lines, and free communication is permitted between master cylinder 12 and said fluid lines, the fluid being permitted to pass either toward or away from the master cylinder. The brakes are operated in the usual manner by exerting a force on the master cylinder piston to apply a pressure in the brake actuating cylinders or motors and thereby stop the vehicle.

When the operator wishes to set the brakes for parking, he pulls the cable 69 which is connected to lever 68, thus forcing rod 66 in a direction to compress spring 64 and move cam member 60 out of the way of stem 62 of valve member 50, thus permitting spring 58 to urge valve member 50 away from its seat at the mouth of passage 44 and against seat 56. Expansible chamber 38 is now in communication with the brake lines. Furthermore, while fluid can be forced from master cylinder 12 past valve member 50 into the brake lines, the fluid will be prevented from returning to the master cylinder by said valve member 50, which now acts as a one-way check valve. If one stroke of piston 14 is not sufficient to displace the necessary fluid to the brakes, the operator may make as many strokes with piston 14 as necessary, since the one-way check valve action of valve member 50, in effect, makes master cylinder 12 a pump capable of any number of strokes. On the return stroke of piston 14, fluid is drawn into master cylinder 12 past valve member 18, in the usual manner. Then on the subsequent pressure stroke of piston 14 this fluid is moved past valve 50 into the brake lines, but due to the pressure of fluid in the lines acting against valve member 50 to hold it seated at 56, the fluid cannot return to the master cylinder, and the brakes will remain set to hold the vehicle parked. When sufficient pressure is built up in the brake lines, it will act on valve member 50 with enough force to prevent cam member 60 from returning to its original position, the spring 64 being maintained under pressure by valve member 50 acting through cam member 60. Consequently, the operator need no longer exert any pressure on lever 68 to hold the cam member 60 out of the way of valve stem 62. The brakes will now remain locked without any further attention from the operator, and the vehicle can be parked for an indefinite length of time. Should changes occur in the volume of fluid in the system, the spring 42 will compensate for them in the manner explained above.

In order to release the brakes after the vehicle has been parked, it is only necessary to actuate piston 14 in master cylinder 12 to build up a pressure sufficient to counteract the pressure locked in the brake lines, thus permitting spring 64 to move the cam member 60 back toward its original position and thereby lift valve member 50 from seat 56 and move it against the force of spring 58 to its original position, as shown in Figures 1 and 4. As a matter of fact, it is not necessary to build up a pressure equal to the pressure locked in the lines in order to release the brakes, since the pressure created by the operator aids spring 64 in returning cam member 60 and stem 62 to normal position. The pressure created in chamber 32 tends to move cam member 60 upwardly to move stem 62 and open valve 54, because the cross-sectional area of rod 66 represents the area differential between the lower face and the upper face of the cam member, and this area may be considered as being worked on by the unit pressure of the fluid tending to return the cam member to the position in which valve 54 is held open. Since the brakes are usually parked under particularly high pressure, there is a definite advantage in being able to release them with less pressure.

After the downward force exerted by the operator on rod 16 has been removed, fluid will return from the brake lines to master cylinder 12, and thence, if necessary, to the reservoir. Furthermore, valve member 50 now acts as a one-way check valve with respect to passage 44, and therefore, fluid under the pressure of spring 42 in chamber 38 is forced past valve member 50 and back to master cylinder 12, the spring 42 returning to the position shown in Figure 2, wherein piston 40 butts against the forward end of chamber 38.

From the foregoing description it is seen that the braking system is conditioned for parking by exerting a pull through the cable 69, while the release is accomplished by building pressure in the bore 12. The structure is effective and compact, not only in the provision of the parking control means, but also in the single valve member which performs several functions. The expansible chamber is cut off from the brake lines during normal operation, and is only cut in for parking, at which time the fluid is trapped to prevent return to the bore 12.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. For use in a fluid pressure system having a pressure-actuated motor and a master cylinder operatively connected thereto, a fluid pressure trapping device comprising a first valve means adapted to act at times as a one-way check valve permitting flow of fluid from the master cylinder to the motor but not in the reverse direction, a variable volume chamber capable of retaining under pressure the fluid in the motor, a second valve means adapted to control communication between the chamber and the motor, a control element which is arranged to control both said first valve means and said second valve means and which in its released position holds the first valve means open to permit free flow of fluid in both directions between the master cylinder and motor and holds the second valve means closed to prevent communication between the motor and the aforementioned chamber, said control element having a pressure responsive area which is acted on by the pressure of the master cylinder and which is so arranged that the master cylinder pressure urges the control element toward released position, a first resilient member arranged to open said second valve means and move said first valve means to the position in which it acts as a one-way check valve whenever the control element moves sufficiently from its released position, a second resilient member which urges the control element toward released position and which is capable of holding it there against the force of the first resilient member, and manually operable means for moving the control element away from its released position.

2. A fluid pressure trapping device for a fluid pressure system comprising a chamber for retaining fluid under pressure, a piston reciprocable therein, a spring acting on said piston to maintain pressure on the fluid in the chamber, a first passage adapted to connect a fluid pressure source with a fluid pressure operated motor, a second passage adapted to connect the aforementioned chamber with the fluid pressure operated motor, a valve member having seating surfaces on opposite sides thereof, one of which is adapted to seat at times against the mouth of the first passage and the other of which is adapted to seat at times against the mouth of the second passage, a spring acting on the valve member tending to move it away from the mouth of the second passage and against the mouth of the first passage, a manually operable cam member comprising a frusto-conical head formed on a rod, said frusto-conical head being adapted in normal position to compress said spring and hold the valve member away from the mouth of the first passage and against the mouth of the second passage, and a spring acting axially on said cam member with sufficient strength to hold it in the normal position except when manually developed mechanical force is exerted on the cam member or when a sufficient pressure urges the valve member against the mouth of the first passage due to fluid pressure locked in the motor, the cross-sectional area of said rod being acted upon by the pressure developed at the pressure source to assist the last-mentioned spring in urging the cam member toward its normal position.

3. A fluid pressure trapping device for a fluid pressure system comprising a chamber for retaining fluid under pressure, a piston reciprocable therein, a spring acting on said piston to maintain pressure on the fluid in the chamber, a first passage adapted to connect a fluid pressure source with a fluid pressure operated motor, a second passage adapted to connect the aforementioned chamber with the fluid pressure operated motor, a valve member having seating surfaces on both sides thereof, one of which is adapted to seat at times against the mouth of the first passage and the other of which is adapted to seat at times against the mouth of the second passage, a spring acting on the valve member tending to move it away from the mouth of the second passage and against the mouth of the first passage, a manually operable rectilinearly movable cam member arranged in its normal position to compress said spring and hold the valve member away from the mouth of the first passage and against the mouth of the second passage, and a spring acting on said cam member with sufficient strength to hold it in the normal position except when the manually developed mechanical force is exerted on the cam member or when a sufficient pressure urges the valve member against the mouth of the first passage due to fluid pressure locked in the motor, said cam member having a pressure responsive area associated therewith which is acted upon by the pressure developed at the pressure source to assist the last-mentioned spring in urging the cam member toward its normal position.

FREDERICK C. FRANK.
WILLIAM H. DU BOIS.

REFERENCES CITED

The following references are of record in the file of this patent:

UNITED STATES PATENTS

| Number | Name | Date |
|---|---|---|
| 2,322,062 | Schnell | June 15, 1943 |